ELECTRONIC ACCUMULATOR

Filed July 8, 1948 4 Sheets-Sheet 1

INVENTOR.
LORING P. CROSMAN
BY Thomas S. Ross
Ralph E. Bitner
ATTORNEYS.

Dec. 18, 1951 L. P. CROSMAN 2,579,174

ELECTRONIC ACCUMULATOR

Filed July 8, 1948 4 Sheets-Sheet 2

*INVENTOR.*
LORING P. CROSMAN

*BY* Thomas S. Ross
Ralph W. E. Bitner
ATTORNEYS.

Dec. 18, 1951 L. P. CROSMAN 2,579,174

ELECTRONIC ACCUMULATOR

Filed July 8, 1948 4 Sheets-Sheet 3

INVENTOR.
LORING P. CROSMAN

BY Thomas S. Ross
Ralph E. Bitner
ATTORNEYS.

Dec. 18, 1951 L. P. CROSMAN 2,579,174

ELECTRONIC ACCUMULATOR

Filed July 8, 1948 4 Sheets-Sheet 4

INVENTOR.
LORING P. CROSMAN
BY Thomas S. Ross
Ralph W. E. Bitner
ATTORNEYS.

Patented Dec. 18, 1951

2,579,174

UNITED STATES PATENT OFFICE 2,579,174

ELECTRONIC ACCUMULATOR

Loring P. Crosman, Darien, Conn., assignor to Remington Rand Inc., New York, N. Y., a corporation of Delaware Application July 8, 1948, Serial No. 37,652

4 Claims. (Cl. 235—92)

This invention relates to an electronic accumulator and has particular reference to a system of electronic triodes which may accumulate digit values in response to applied electrical pulses. While the invention is subject to a wide range of applications, it is especially suited for use in an electronic calculator and will be described in that application.

In order to reduce the number of tubes and circuits, two counters are employed to accumulate values from zero to nine; a radix-of-two counter and a radix-of-five counter. Each counter uses stabilized trigger circuits for the recording of digit values. As used throughout the specification and claims, the term "unbalanced trigger" refers to a trigger stage comprising two electronic triodes with circuit components so adjusted that the circuit is stable only when one triode is conducting and the second triode is non-conducting. Applying an actuating pulse to such a stage momentarily switches conductivity and generates a pulse, the duration of which depends upon the circuit constants. This type of circuit is also called a "one-shot multivibrator" and a "flip-flop."

Electronic accumulators have been used in many applications where speed of recording is the dominant factor of design and operation. The first and most obvious design included ten stages for each denominational order, each stage representing a digit from zero to nine. Such a design required a large number of vacuum tubes and efforts have been made to reduce the number of stages and tubes by various circuit arrangements. One type of counter uses only four stages, but the difficulties in decoding and reading out the accumulated values make this type of circuit difficult to handle. The present circuit design requires six counter stages and is designed to facilitate the operations involving addition, subtraction, multiplication, and division.

It is an object of this invention, therefore, to provide an improved accumulator circuit which avoids one or more of the disadvantages and limitations of prior art arrangements.

Another object of the invention is to provide an electronic accumulator which can be operated by a series of electric pulses generated by a multivibrator.

Another object of the invention is to provide an electronic accumulator with a radix-of-two counter and a radix-of-five counter with an actuating circuit for directly entering digit values into either counter.

The invention comprises an accumulator for receiving and storing values from one to nine and comprises, a radix-of-two counter for recording single digit values received from a pulse generator, and a radix-of-five counter for recording double digit values received from a pulse generator and from the radix-of-two counter.

One of the features of the invention includes a double triode trigger circuit which is actuated by a single pulse when a "one" is entered into the accumulator or when any other odd digit is recorded.

Another feature of the invention includes a series of five double triode trigger circuits which are actuated whenever an even digit is recorded by the accumulator.

For a better understanding of the present invention, together with other and further objects thereof, reference is made to the following description taken in connection with the accompanying drawings.

Figs. 2 and 3 are to be combined to show the complete wiring diagram of the system.

Figure 1:
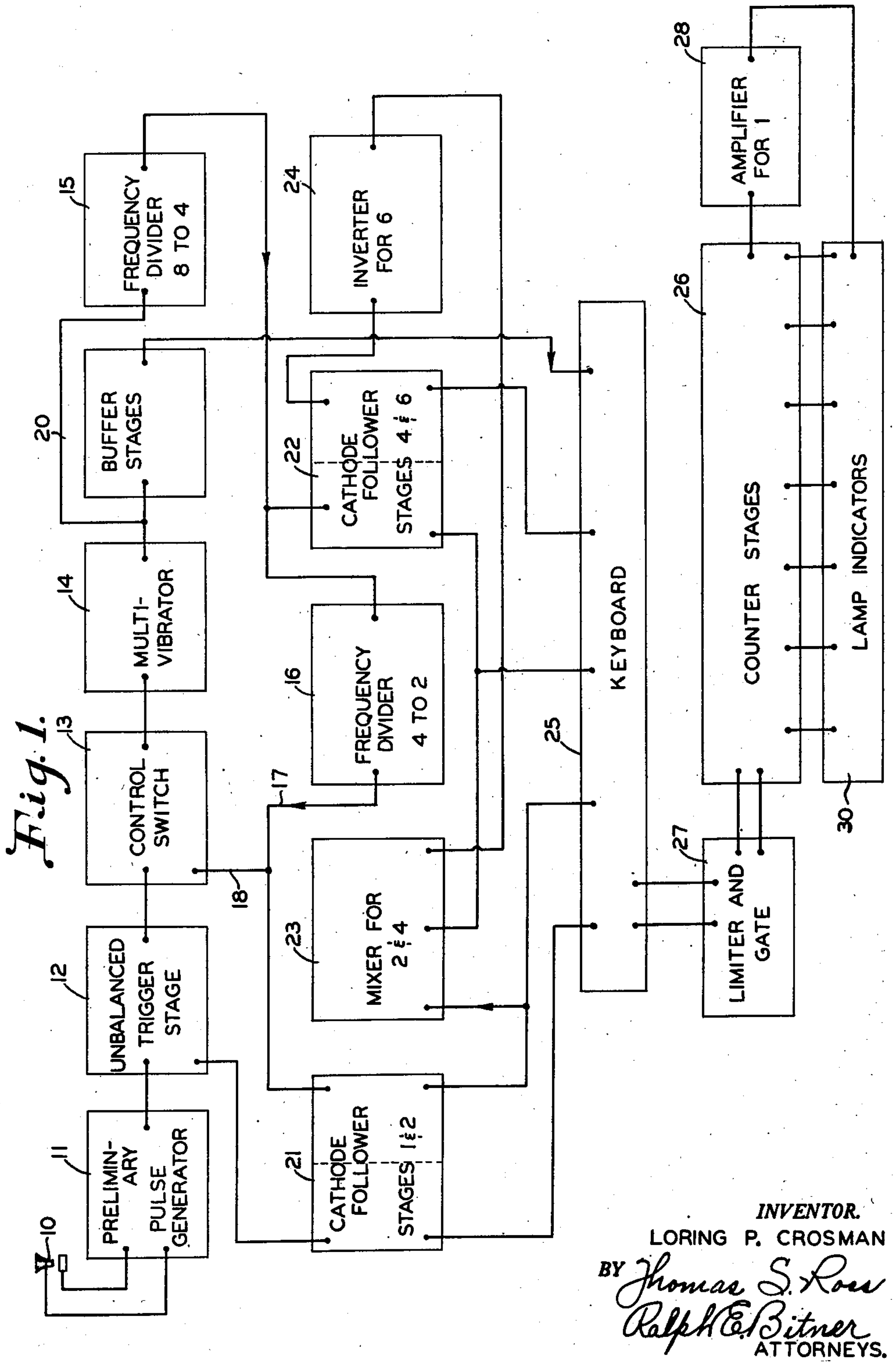
Fig. 1 is a block diagram showing how the various stages are connected.

Referring now to Fig. 1, the entire system will be generally described, neglecting at present the detailed features of the invention. A starting key 10 is connected to a preliminary pulse generator 11 which generates a sharp pulse (Fig. 5–*a*) when the key contacts are made. Next, an unbalanced trigger stage 12 transforms the sharp pulse into a broad flat-topped pulse (Fig. 5–*b*) of the same magnitude and duration as the pulses which later are generated by the multivibrator. The unbalanced trigger stage 12 also controls an electronic switching stage 13 which turns on a multivibrator oscillator 14. The switching stage 13 is also operated, but in a reverse direction, by a frequency divider stage 16 to turn the multivibrator off.

Figure 5:
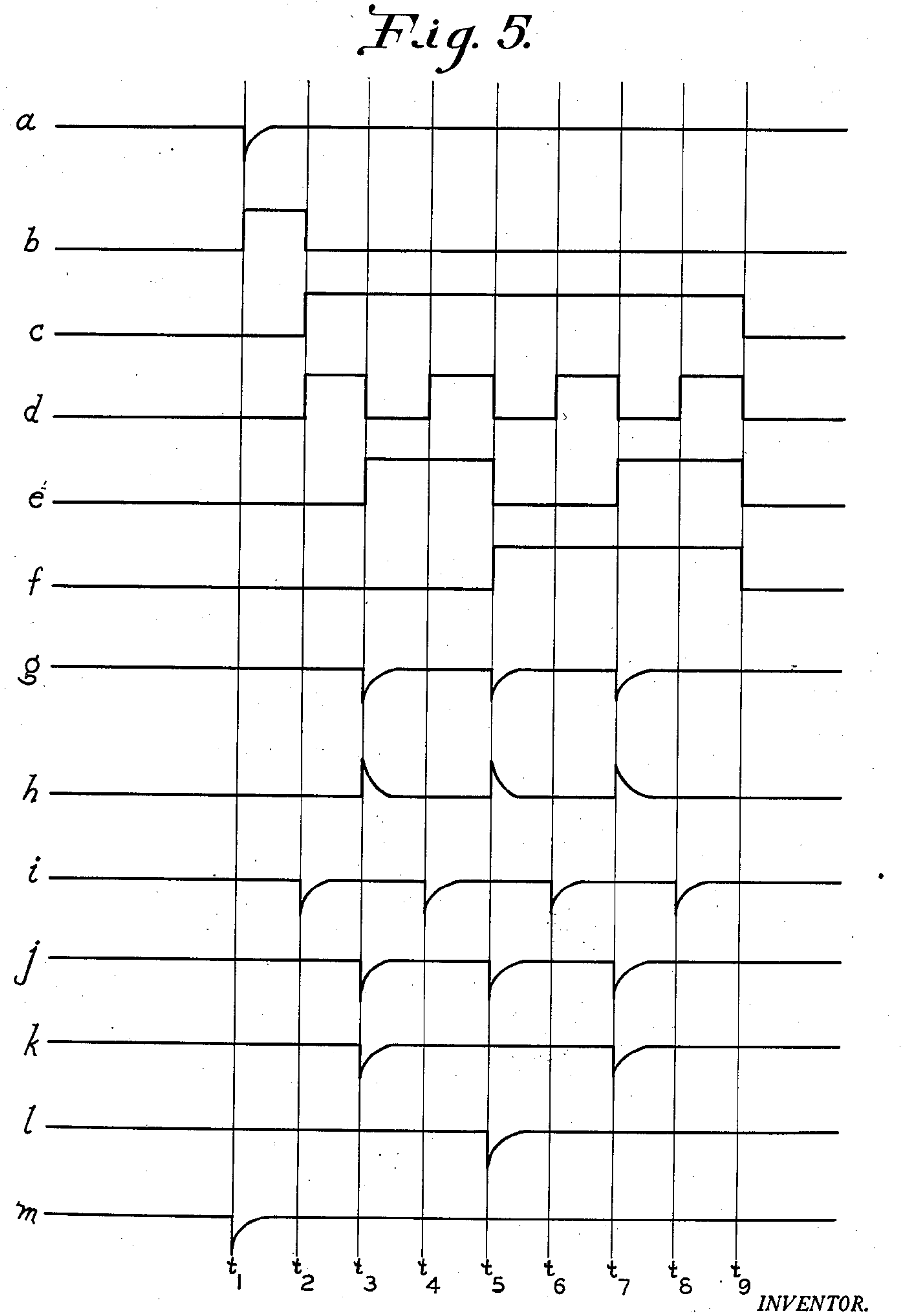
Fig. 5 is a series of graphs showing the character of the pulses produced in various parts of the circuit.

The output of the multivibrator, in this example equal to four pulses (Fig. 5–*d*) is fed to a frequency divider 15 which reduces the four pulses to two (Fig. 5–*e*), and these two pulses are fed to a second frequency divider 16 which reduces the number of pulses to one (Fig. 5–*f*). The output of this divider is fed back over conductors 17 and 18 to the switching stage 13, as explained above, and the multivibrator is turned off when the single pulse ends. The conductivity characteristic of the switching stage is shown in Fig. 5–*c*.

During the process, above described, of generating a single starting pulse and four oscillation pulses which are divided into two pulses and a single pulse, there are made available at various portions of the circuit, single, double, and quadruple pulse trains which may be used singly or in combination to produce sharp pulse trains (Figs. 5–*i* to 5–*m*) to count from one to nine. To this end, four buffer stages 20, 21, 22, and 27 are provided, also a mixer stage 23, and an inverter 24.

Fig. 5 shows a number of pulse forms as they appear in different parts of the circuit, arranged in their proper phase relation. Curve 5–*i* shows the wave-form of the sharp pulses from the multivibrator after they have been transmitted through buffer stages 20 and 27. The output from the first frequency divider 15 is shown at 5–*e*, and this wave form is changed to 5–*k* after passing through the left-hand part of buffer stage 27. The result is a double pulse with points occurring at times $t_3$ and $t_7$. The output of the second frequency divider 16 is a single pulse 5–*f*. When this is fed to the left-hand side of buffer stage 27, a single sharp pulse results (5–*l*), the point occurring at time $t_5$. The above described pulses may be combined to form a triple pulse 5–*j* by sending the two wave trains (5–*e* and *f*) through the mixing stage 23.

Referring again to Fig. 1, a keyboard 25 contains ten manually settable switches which designate and control the number and value of the pulses transmitted to an accumulator or counter circuit 26. If the number to be transmitted is even, the pulses are delivered to the left-hand side of amplifier stage 27 (shown in detail in Fig. 3), and then transmitted to all the radix-of-five stages in the accumulator. If the number to be recorded is one, the keyboard switch delivers a single pulse to the right-hand side of stage 27 where it is amplified and sent to stage 28, the radix-of-two counter. If the number to be recorded is odd and greater than one, a single pulse is sent to the right-hand side of stage 27 while the remaining pulses, representing an even value, are sent through the left-hand side of stage 27 to the radix-of-five stages in counter 26.

The output of the counter stages 26 and 28 may be used by any suitable calculator circuit, storage device, or read-out mechanism. In order to simplify the circuit, the present system is shown operating a bank of ten lamp indicators 30.

Figure 2:
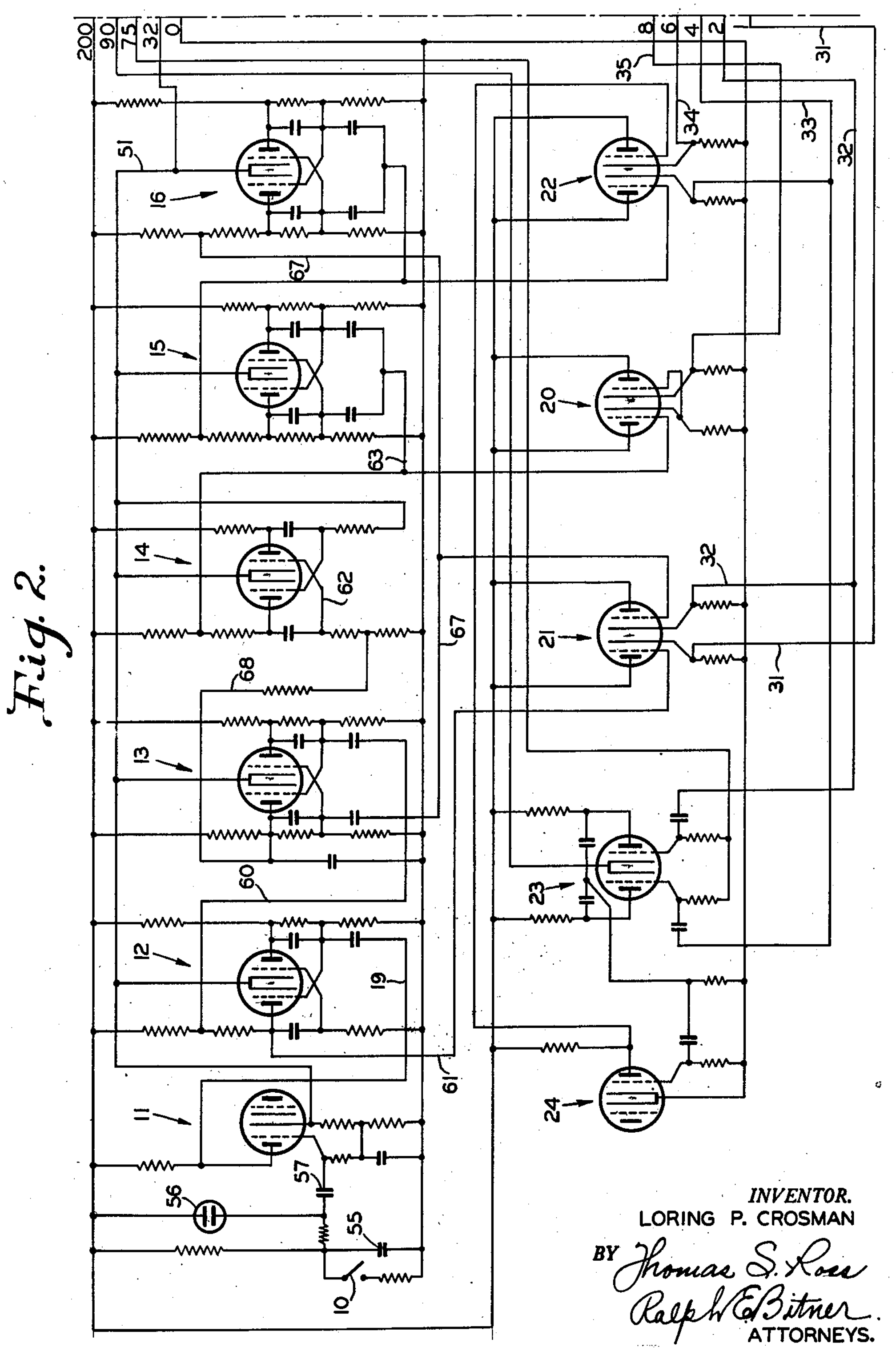
Fig. 2 is a schematic diagram of connections and shows the essential components of the pulse generating system.
Figures 3, 4:
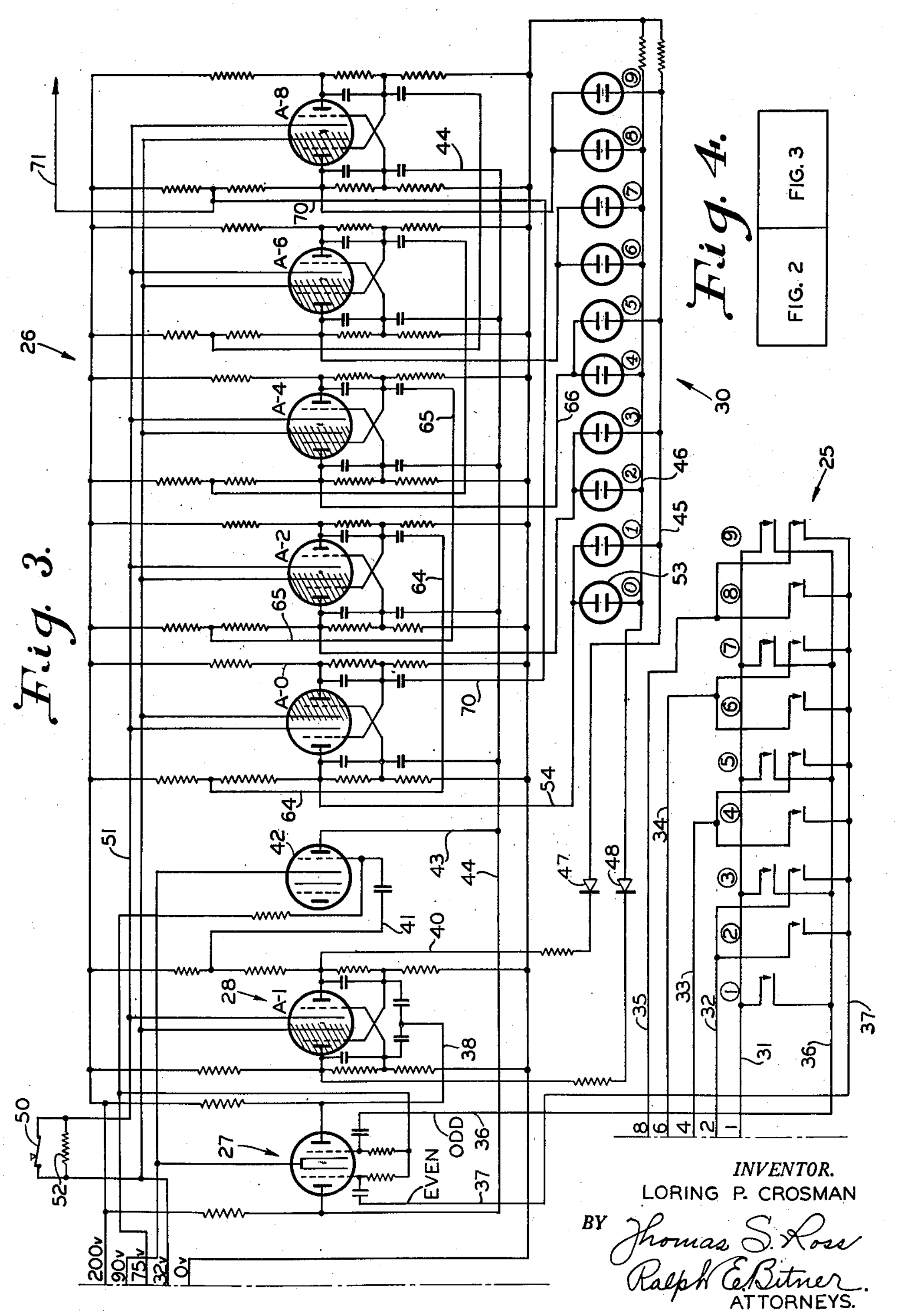
Fig. 3 is a schematic diagram of connections and shows the components of the accumulator, the keyboard and the lamp digit indicators.
Fig. 4 is a diagram which indicates how

Having now described the general system of pulse generation, reference is made to Figs. 2 and 3 where the detailed schematic wiring diagram is shown. The detailed description of pulse generation is set forth in patent application, Serial No. 18,782, filed April 3, 1948, now Patent No. 2,512,861, issued June 27, 1950. The net result of the pulse generating system is to provide a single pulse at time $t_1$ (Fig. 5–*b*) on conductor 31; also a single pulse having double value at time $t_5$ (Fig. 5–*f*) on conductor 32; also a double pulse representing the value of four at times $t_3$ and $t_7$ (Fig. 5–*e*) on conductor 33; also a triple pulse representing the value of six having pulse rise points at times $t_3$, $t_5$, and $t_7$ (Fig. 5–*h*) on conductor 34; and a quadruple pulse representing the value of eight having pulse rise points at times $t_2$, $t_4$, $t_6$, and $t_8$ (Fig. 5–*d*) on conductor 35.

All the conductors, 31 to 35, for the transmission of counting pulses are connected to one or more of the nine keys in keyboard 25. The conductor 31 which transmits a single pulse at time $t_1$ is connected to all the odd designated keys and when these keys are closed, connection is made for this pulse to be transmitted over conductor 36 to the right-hand side of amplifier stage 27.

Conductor 32 which carries a single double valued pulse is connected to keys 2 and 3. Conductor 33 connects to keys 4 and 5, and conductors 34 and 35 connect to key groups 6, 7 and 8, 9 respectively. All the double valued pulses are connected by the keyboard switches to a conductor 37 which runs to the control electrode of the left-hand side of amplifier stage 27.

Stage 27 is a limiter stage and is normally adjusted with the control electrodes biased below the conducting value so that only positive pulses will cause conduction in the anode circuit. A negative pulse has no effect on the conductivity. The odd or right-hand section of stage 27 has its output connected to trigger stage A–1 which is the radix-of-two counter. It is normally conducting on the left-hand side. A single positive pulse transmitted over conductor 36 produces a negative pulse in anode conductor 38 and actuates stage A–1, transferring the conducting path within the tube to the right-hand side. This lowers the potential of conductors 40 and 41 and delivers a negative pulse to the control electrode of tube 42. Tube 42 is a buffer amplifier with its control electrode biased below the potential for anode conductance, hence a negative pulse applied to this tube causes no effect. If a second pulse is applied from stage 27 over conductor 38 to actuate stage A–1, the conductance will be shifted back to the left-hand side and a positive pulse will be sent over conductor 41 to tube 42. This pulse will be transmitted, since it is positive and increases the potential of the control electrode of tube 42. The anode current surge sends a negative pulse over conductor 43 to conductor 44 which connects with all the radix-of-five stages and actuates any of them that are conducting on the right-hand side. The five trigger stages which make up the radix-of-five counter represent the even numbered digits in the decimal or denary system and are designated A–0, A–2, A–4, A–6, and A–8 to indicate the values handled by them. The A–0 has part of its output connected to the left-hand control electrode of the A–2 stage; the output of the A–2 stage is connected to the left-hand control electrode of the A–4 stage; the A–4 and A–6 stages being similarly connected, and the A–8 stage output connected back to the control electrode of the A–0 stage and also connected to the carry circuit which carries to the next higher denominational order.

Each of the five stages, A–0 to A–8, has the output of its left-hand section connected to one terminal of two neon indicator lamps in the lamp indicator assembly 30. The other terminals of the lamps are connected by conductors 45 and 46 to rectifying elements 47 and 48 and then to the two anodes in stage A–1. A detailed explanation of the neon lamp indicator circuit may be found in U. S. patent application, Serial No. 33,947, filed June 19, 1948, now Patent No. 2,563,102, issued August 7, 1951.

A zeroize or normalizing key 50 is included in series with one of the cathode conductors 51 so that its opening will insert a resistance 52 in series with all the cathodes that normally should be non-conducting. The zeroizing action also extends to the pulse generator stages and normalizes any trigger stage in that circuit that may not have been left in the normal condition.

*Operation*

In order to describe the operation, let it first be assumed that the circuit is in its normal or quiescent state. Counter stages A–1, A–2, A–4, A–6, and A–8 are all conducting on the left-hand side and A–0 is conducting on the right. The cross-hatched lines on the tube drawings in Fig. 3 indicate the conductive condition. Neon indicator lamp 53 (designating zero) is lighted because one of its conductors 54 leads to the anode in stage A–0 which is at high potential and the other conductor 46 leads through rectifier 48 to the anode of stage A–1 which is at low potential.

Now assume that the number 4 key in the keyboard be depressed, joining conductors 33 and 37. Then the start key 10 is closed, and condenser 55 is discharged thereby providing voltage for the ionization of neon tube 56 and impressing a voltage rise on condenser 57. This action impresses a sharp negative pulse on the anode of the tube in stage 11, the form and timing of which are shown in Fig. 5–*a*. This pulse is transmitted over conductor 19 to the unbalanced trigger stage 12 which produces a flat-topped wave (Fig. 5–*b*) which is transmitted over conductors 60 and 61 to the control electrode of switching stage 13 and buffer amplifier stage 21.

The application of a pulse to stage 13 turns on the multivibrator by increasing the potential on control electrode 62 to a value that permits oscillation. The output of the multivibrator is transmitted over conductor 63 to the first frequency divider stage 15 where the four pulses generated by the multivibrator are transformed into two pulses (Fig. 5–*e*) and then applied to the left-hand side of buffer amplifier 22. The output of amplifier 22 is carried by conductor 33 to the key 4 which is closed, then over conductor 37 to the left-hand side of amplifier stage 27 which normally is biased to the cut-off point. The output of stage 27 is transmitted over conductor 44 as two sharp negative pulses (Fig. 5–*k*) and is applied to the right-hand control electrodes of all the counter stages in the radix-of-five counter. The first negative pulse actuates only the A–0 stage since it is the only stage conducting on the right-hand side. The application of the pulse changes the anode conduction to the left-hand side and in making the transfer, a negative pulse is sent over conductor 64 to the left-hand control electrode of the A–2 stage and transfers its conductance to the right-hand side.

When the second negative pulse from stage 27 is transmitted over conductor 44, it actuates only the A–2 stage since at this time it is the only stage that is conducting on the right. The conductance of the A–2 stage will be transferred to the left-hand side, and, in so doing, a pulse will be sent over conductor 65 and actuate the A–4 stage by transferring the conductance to the right-hand side. Hence, at the end of the double negative pulse, only the A–4 stage is conducting on the right. This condition causes the number 4 neon indicator lamp to be lighted since one of its conductors 66 is connected to the left-hand anode of stage A–4 which is now at high potential while the other conductor 46 leads to the left-hand anode of stage A–1 which is at low potential.

The above described action is finished a small interval of time before the end of a pulsing cycle since the second activating pulse occurs at time $t_7$ as shown on Fig. 5–*k*. The multivibrator continues with its fourth pulse and is finally turned off by the action of the second frequency divider stage 16, which sends a pulse at time $t_9$ over conductor 67 to the right-hand control electrode in stage 13 which reduces the potential on conductor 68 and stops the multivibrator action.

After the finish of the pulsing cycle, the counter stages and the indicator lamps 30 remain in their operated condition so that they may be ready for additional pulses or until the result may be copied or transferred to another part of the calculator system.

In order to illustrate the action of the A–1 stage, let it be assumed that the counter stages are left with the digit value of four recorded therein and the "5" key depressed. Then, when the start key 10 is closed, the same train of pulses is started as was described above. The same two pulses will be transmitted over conductor 33, through the bottom contacts of the number five key, and thence over conductor 37 to the left-hand side of stage 27. But, in addition, and before the transmittal of the double pulse (Fig. 5–*k*), a single pulse (Fig. 5–*b*) is transmitted from the unbalanced trigger stage 12 over conductor 61, through amplifier stage 21, over conductor 31 to the top contacts of the "five" key, thence over conductor 36 to the right-hand side of stage 27.

The single positive pulse transmitted to stage 27 is sent over conductor 38 as a negative pulse to stage A–1. This pulse actuates the A–1 stage and transfers the anode conductance to the right-hand side. When the right hand anode is made conducting, a negative pulse is sent over conductor 41 to tube 42. This tube, however, has its control electrode biased to the cut-off point and the negative pulse has no effect.

The two pulses transmitted through the bottom contacts of key number 5 to the left-hand side of amplifier stage 27 are applied to conductor 44, and by actuating two stages, as described above, advance the actuated stages by two to the A–8 position.

The accumulator has now an actuated A–8 stage and an actuated A–1 stage and has thereby recorded the value "nine."

Let it now be assumed that a "one" is to be added to the accumulator. The "one" key in the keyboard is depressed, and conductors 36 and 31 are connected. When the start key 10 is depressed, a single positive pulse is sent over conductor 36 to the right-hand side of stage 27, which in turn sends a negative pulse over conductor 38 to actuate stage A–1. This time the conductance is shifted from the right-hand side to the left, and a positive pulse is sent over conductor 41 to tube 42. This time the pulse is transmitted and appears as a negative pulse on conductors 43 and 44, applied to all the right-hand control electrodes of the radix-of-five counter. The only stage which is conducting on the right side is the A–8 stage, and it is the only one actuated. Conductance is shifted to the left-hand side, and a negative pulse is sent out from the left-hand anode circuit. The pulse is transmitted by conductor 70 to the left-hand control electrode of stage A–0 which is thereby actuated, and the conductance is returned to the right-hand anode, its normal position. The voltage pulse generated by the A–8 actuation is also transmitted over a carry conductor 71, which sends a pulse to a storage trigger stage (not shown) associated with the next higher denominational order. A short interval of time after the end of the accumulator cycle, the carry value is applied to the next radix-of-two counter.

All the stages are now in their original or normalized condition, except the next higher order accumulator which has recorded a "one." The illustrated accumulator has recorded a "4," a "5," and a "1" in additive relation, and the result is a "10." It will be obvious how other digit values are recorded. All even valued members are recorded by transmitting a number of pulses to the radix-of-five counter; the number of pulses being equal to half the number to be recorded. All odd numbers are recorded by actuation of the radix-of-two counter, and the recording of one less than the desired odd number in the radix-of-five counter.

Actuating pulses for recording two and four are illustrated in Figs. 5–*l* and 5–*k* by single and double negative pulses and are obtained from frequency divider stages 16 and 15 and shaped by the differentiating action of amplifier stage 27. Actuating pulses for recording eight are shown in Fig. 5–*i* and are obtained from the multivibrator output acting through stages 20 and 27. Actuating pulses for recording six are shown in Fig. 5–*j* and are obtained from mixer stage 23 by the addition of a single pulse and a double pulse. An inverter stage 24 (Fig. 5–*h*) and the right-hand side of buffer amplifier 22 are employed to obtain the proper output and polarity.

From the above description, it will be evident that the invention may be used to accumulate digit values by using a radix-of-two counter and a radix-of-five counter in combination with a pulse generating system especially suited to this combination.

While there have been described and illustrated, specific embodiments of the invention, it will be obvious that various changes and modifications may be made therein without departing from the field of the invention which should be limited only by the scope of the appended claims.

What is claimed is:

1. An electronic accumulator for receiving and storing digit values from zero to nine comprising, a radix-of-two counter which includes a double-triode trigger stage and a first input circuit for receiving operating pulses, a pulse generator coupled to the first input circuit for registering single digit values during one part of a counting cycle, a radix-of-five counter which includes five double-triode trigger stages and a second input circuit for receiving operating pulses, a pulse generator coupled to the second input circuit for registering double digit values during a second part of the counting cycle, and a carry circuit for transferring a carry pulse from the radix-of-two counter to the radix-of-five counter when the radix-of-two counter progresses from a count of one to a count of zero.

2. An electronic accumulator for receiving and storing digit values from zero to nine comprising, a radix-of-two counter which includes a double-triode trigger stage and a first input circuit for receiving operating pulses; a pulse generator coupled to the first input circuit for registering single digit values during one part of a counting cycle; a radix-of-five counter which includes five double-triode trigger stages, each of which is assigned an even digit value, and a second input circuit for receiving operating pulses; a pulse generator coupled to the second input circuit for registering double digit values during a second part of the counting cycle; and a carry circuit for transferring a carry pulse from the radix-of-two counter to the second input circuit when the radix-of-two counter progresses from a count of one to a count of zero.

3. An electronic accumulator for receiving and storing digit values from zero to nine comprising, a radix-of-two counter which includes a double-triode trigger stage and a first input circuit for receiving operating pulses; a pulse generator coupled to the first input circuit for registering single digit values during one part of a counting cycle; a radix-of-five counter which includes five double-triode trigger stages, each of which is assigned an even digit value, and a second input circuit for receiving operating pulses; a pulse generator coupled to the second input circuit for registering double digit values during a second part of the counting cycle; a carry circuit for transferring a carry pulse from the radix-of-two counter to the second input circuit when the radix-of-two counter progresses from a count of one to a count of zero; and a second carry circuit for transferring a carry pulse from the radix-of-five counter to the radix-of-two counter in the next higher denominational order when the radix-of-five counter progresses from a count of nine to a count of zero.

4. An electronic accumulator for receiving and storing digit values from zero to nine comprising, a radix-of-two counter which includes a double-triode trigger stage and a first input circuit for receiving operating pulses; a pulse generator coupled to the first input circuit for registering single digit values during one part of a counting cycle; a radix-of-five counter which includes five double-triode trigger stages, each of which is assigned an even digit value, and a second input circuit which is connected to all of said radix-of-five trigger stages in parallel arrangement for receiving operating pulses; a pulse generator coupled to the second input circuit for registering double digit values during a second part of the counting cycle; a carry circuit for transferring a carry pulse from the radix-of-two counter to the second input circuit when the radix-of-two counter progresses from a count of one to a count of zero; and a second carry circuit for transferring a carry pulse from the radix-of-five counter to the radix-of-two counter in the next higher denominational order when the radix-of-five counter progresses from a count of nine to a count of zero.

LORING P. CROSMAN.

REFERENCES CITED

The following references are of record in the file of this patent:

UNITED STATES PATENTS

| Number | Name | Date |
|---|---|---|
| 2,401,621 | Desch et al. | June 4, 1946 |
| 2,402,989 | Dickinson | July 2, 1946 |
| 2,436,963 | Grosdoff | Mar. 2, 1948 |
| 2,470,716 | Overbeck | May 17, 1949 |

FOREIGN PATENTS

| Number | Country | Date |
|---|---|---|
| 572,884 | Great Britain | Oct. 29, 1945 |

OTHER REFERENCES

A Four-Tube Counter Decade, Potter, Electronics, September 1944, pp. 110–113, 358 and 360.

Electronic Counters, Grosdoff, RCA Review, September 1946, p. 442.

High-Speed N-Scale Counters, by T. K. Sharpless, Electronics, March 1948; pp. 122–125.